3,306,704
MANUFACTURE OF DIBORANE AND RELATED BORON-CONTAINING SUBSTANCES
Ramsey G. Campbell, Berkeley, and Loren J. Hov, Richmond, Calif., assignors to Stauffer Chemical Company, New York, N.Y., a corporation of Delaware
No Drawing. Filed Apr. 14, 1958, Ser. No. 728,492
9 Claims. (Cl. 23—204)

This invention relates in general to the production of diborane using various boron feed sources and hydrogen.

It is known that boron-hydrogen bonded material may be produced by passing boron trichloride and hydrogen through an electric discharge to produce boron-hydrogen bonded chlorinated boranes. Elemental boron and hydrogen chloride are two of the many by-products of such a reaction. Because of rather poor yields with little control over products and because of by-product formation this reaction technique is not an economical one. It is known that small quantities of diborane or boron-hydrogen bonded chlorinated boranes may be produced by passing boron trichloride and hydrogen over a bed of a hydrogen chloride "getter" metal, such as aluminum, at moderate temperatures. The metal chloride and hydrogen chloride are by-products of such a technique and the yield of the borane is small. More recently it has been discovered that boron trichloride and hydrogen may be made to react by passing them alone through a heated tube to produce boron-hydrogen bonded chlorinated boranes in good yield and in such a fashion that a majority of the boron values are converted to the desired product. Boron in such a reaction is a minor by-product while the major by-product is hydrogen chloride. Nearly all of the chlorine values fed in such a system end up as by-product hydrogen chloride. This process, while more economical than the electric discharge process or other known processes, produces about three gram moles of hydrogen chloride per gram atom of boron converted to product.

It is also known that diborane may be produced by inter-reaction of alkali hydrides or boro-hydrides and a boron halide. In some of such processes an exceedingly large amount of electrical power is necessary for the ultimate production of the reactants, much of said electric power being utilized in electrolytic processes to conserve halides and/or alkali used. The related non-electrolytic processes have various other disadvantages.

It is therefore an object of this invention to provide a novel process for the production of boron-hydrogen bonded chlorinated boranes which may be converted into diborane.

It is a further object of this invention to provide a process for the production of diborane by a reaction between hydrogen and certain boron-containing materials.

It is another object of this invention to provide a continuous process wherein various intermediates and unreacted material may be recycled in the process so as to result in a highly efficient operation.

It is yet another object to provide a process wherein no separation of the species hydrogen and hydrogen chloride is necessary or desirable.

Yet another object is to provide a process for the production of diborane which produces quantities of boron trichloride as a by-product which can be separated readily from the process stream and utilized elsewhere.

Other objects and advantages of this invention, if not specifically set forth, will become apparent during the course of the following detailed disclosure.

In general, this invention involves the production of diborane by the preparation of chlorinated borane intermediates which thereafter may be readily converted to the desired product. An integral reaction system is used wherein a source of boron such as element boron, boron carbide or a boron hydride is fed to a reactor together with a source of chlorine values such as $BCl_3$ and $HCl$ and a source of hydrogen such as $H_2$ or $HCl$. Various of the boron, hydrogen and chlorine sources may be used in combination with one another. The chlorinated borane intermediate so prepared is disproportionated to diborane and $BCl_3$. The boron trichloride, hydrogen and hydrogen chloride exiting the reactor or subsequently produced by disproportionation are recycled back through the integral reactor together with make-up hydrogen and a source of boron as defined above. The hydrogen and hydrogen chloride are recycled as a single stream without separation in the preferred embodiment of the invention.

More particularly, this invention involves the indirect hydrogenation of a boron source wherein boron trichloride is utilized, but not as the boron source. Rather, it merely acts as a carrier of part of the chlorine and boron values.

Similarly, hydrogen chloride is utilized as an essential component of the reaction system but never appears in the overall material balance as it acts merely as a carrier of part of the chlorine and hydrogen values.

In actual fact, both the hydrogen chloride and the boron trichloride may be considered reactants but their quantities remain at constant levels throughout since as much of both is formed as is used up by reaction in the overall system.

This invention involves the use of a reactor maintained at an elevated temperature and most conveniently, although not necessarily, at or within a few PSI of atmospheric pressure, into which is fed a boron source, preferably boron and/or boron carbide, and into which also is fed a mixture of fresh feed hydrogen and recycle hydrogen, hydrogen chloride and boron trichloride. The gaseous exit from this reactor consists of hydrogen, hydrogen chloride, boron trichloride and boron-hydrogen bonded chlorinated boranes. These hydrogen-containing boranes may consist of a single borane or may consist of several boranes. In either case, they may be disproportionated suitably into diborane and boron trichloride by methods known to the art. For the sake of clarity in the following discusstion, they will be referred to as dichloroborane, although the actual species present makes no difference since all are subsequently disproportionated into diborane and boron trichloride.

It should also be pointed out here that when reference is made to a given chemical species, it is not to be assumed necessarily that perfect purity is implied. In practice, many of the materials described herein may contain small amounts of impurities without adversely affecting results.

The gaseous exit from the reactor may be suitably quenched as by the use of a quenching medium, boron trichloride being a preferred fluid. This quenching, preferably rapid, is found to be advantageous since it tends to freeze the composition of the exiting gas. The slower the exit gases are allowed to cool, the lower will be the yield of the desired dichloroborane—due to back reaction and/or disproportionation.

The cooled exit material from the reactor, hydrogen, hydrogen chloride, boron trichloride and the boron-hydrogen bonded material, here called dichloroborane, may be further handled in any convenient manner so as to achieve two ends, (a) prepare diborane from the dichloroborane and remove such diborane as product, and (b) recycle back to the reactor in the most economical manner all other material which is not diborane. This essentially is the key to the invention which makes it truly economical; all material which is not the desired product (diborane) is recycled back to the reactor with no need for expensive separations except insofar as they may be necessary for recovery of diborane. The necessary disproportionation of dichloroborane to diborane and boron trichloride and subsequent separation of these two materials are operations which are known to the art and amenable to standard chemical engineering practice and per se, form no part of the invention except insofar as they represent steps of a complete process. In the practice of the invention, it is preferred to perform these operations as will be later described. But various other methods of performing such operations are possible and will be evident to those skilled in the art.

The cooled products of the reactor, which may contain quench boron trichloride as well, may be passed to a low temperature distillation column wherein the hydrogen, hydrogen chloride and any diborane present are taken off as top products and recycled directly back to the reactor without any need for separation.

The bottom product of the distillation column, consisting of dichloroborane and boron trichloride, is removed and the dichloroborane suitably disproportionated into diborane and boron trichloride. This diborane is removed as product, by fractionation or other suitable means, and the boron trichloride from the column bottoms together with the boron trichloride formed by disproportionation of the dichloroborane is recycled directly back to the reactor (or part is sent back as quench liquid not in excess of the amount that had been put into the stream as quench liquid). It is apparent that a surge tank at this point to offer some hold up of boron trichloride before recycle to the reactor is advantageous for smoother operation of this system. Various methods of removal of the dichloroborane may be utilized but a distillation column is preferred because of its simplicity and ease of operation.

In addition, the boron source is fed to the reactor to the extent that boron is removed. Further, hydrogen is fed to the reactor to the extent that hydrogen is removed. The amount of boron and hydrogen removed and hence the amount which must be replaced may be ascertained by determining the quantity of diborane, ultimately secured and/or by a component analysis of the various streams.

In the preferred embodiment of the invention, the source of boron is boron and/or boron carbide. Preferably, either one or both of these materials are reacted with HCl whereby to produce $BCl_3$ and hydrogen, and the $BCl_3$ and hydrogen in turn react to produce the desired dichloroborane intermediate. Actually, it is probable that numerous reactions occur within the reactor, and that various undefined intermediates are formed. Nevertheless, the aforementioned products are the most important by far, and the other products can, as a practical matter, be ignored. For example, it is entirely possible that the hydrogen chloride combines directly with elemental boron or boron carbide to yield a boron-hydrogen bonded chlorinated borane and hydrogen. It is also possible that the boron trichloride, formed as a reaction product from boron and HCl, may combine directly with hydrogen to produce other boron-hydrogen bonded chlorinated boranes than the dichloroborane which is mentioned above as the chief reaction product. In all events, however, it is certain that the exit gases contain hydrogen, hydrogen chloride, boron trichloride and boron-hydrogen bonded chlorinated boranes which may be disproportionated into diborane and boron trichloride by a reaction similar to the following:

$$6BHCl_2 \rightarrow B_2H_6 + 4BCl_3$$

Also, it has been found that when the exiting gases, exclusive of the product diborane, are recycled and boron and hydrogen added thereto in the amount which is removed permanently from the system, an equilibrium system is secured. The equilibrium system yields the same amount of hydrogen chloride exiting the reactor as entered the reactor. In other words, as far as the overall reactions in our reactor are concerned, hydrogen chloride is neither produced nor consumed. It is also found that boron trichloride is consumed in the reactor, but the same amount of boron trichloride is produced upon disproportionating the boron-hydrogen bonded chlorinated borane as is consumed in the reactor.

Stated differently, as a result of the overall process for the production of diborane, neither boron trichloride nor hydrogen chloride are produced or consumed. The total reaction series may be set forth and summed as follows:

$$6BCl_3 + 6H_2 \rightarrow 6BHCl_2 + 6HCl$$
$$2B + 6HCl \rightarrow 2BCl_3 + 3H_2$$
$$6BHCl_2 \rightarrow B_2H_6 + 4BCl_3$$

$$2B + 3H_2 \rightarrow B_2H_6$$

Thus, one arrives at an overall system equation which does not show hydrogen chloride and boron trichloride entering at all but which shows merely the simple hydrogenation of boron to diborane. Similar equations can be written using boron carbide and the only change that is seen in the overall reaction is that boron carbide is the boron source and carbon is produced as a by-product.

It has been found that the invention may be employed with any reasonable ratio of hydrogen values to chlorine values such as from 1:10 to 10:1 although a preferred ratio is between 1:3 and 3:1. This ratio is defined as the hydrogen value to chlorine value ratio. That is, boron trichloride would have a ratio of zero; hydrogen chloride, one; and $BHCl_2$ one-half. It has been found that by feeding the reactor at the outset with any ratio of hydrogen-to-hydrogen chloride-to-boron trichloride, a process equilibrium will be reached whereat the equilibrium concentrations are dependent solely upon the hydrogen-to-chlorine value ratio. For example, it is found that if the reactor is fed initially with a ratio of two moles of boron trichloride to three moles of hydrogen, the same equilibrium concentrations of all gases are achieved as if the reactor had been fed only with hydrogen chloride or with one mole of hydrogen chloride to one mole of boron trichloride to one and one-half moles of hydrogen. However, it should be noted that the non-dependence of the equilibrium status upon the boron values implies that at least process equilibrium requirements of boron feed are present and preferably an excess of the boron feed is present. That is to say, more boron values preferably are present in the system than are needed for process equilibrium. Boron feed is such that it at least matches boron value withdrawal and any excess boron in the reactor may remain there to insure full process equilibrium. The obvious effect of failure to meet the boron value requirements is that reduced production of the dichloroborane (and ultimately of the diborane) is encountered.

The reactor may be operated successfully over temperatures from about 700° C. to about 1500° C. The preferred range is between about 900° C. and 1300° C. Such ranges are suitable not only for the preferred boron or boron carbide materials but also for the additional boron sources to be described below.

A preferred process set-up involves the interpositioning of a cyclone separator between the quenching zone and the distillation column making it possible to operate smoothly and continuously even though the boron source is contaminated, such as with combined oxygen or free or combined carbon. The cyclone operates to remove such contaminants.

Alternatively, when boron carbide is used as the boron source the carbon may be removed in other fashions, such as by continuous solids withdrawal from the reactor. This is true whether the reactor is of the fluidized, fixed or moving bed type.

As indicated, the preferred boron sources are elemental boron and boron carbide. But other sources of boron may be used with slight modification being necessary in the operating conditions.

The second class of boron sources is the boron hydrides. These boranes may be used to make diborane whether they exist normally in the solid, liquid or gaseous state. The unsubstituted boron hydrides contain a hydrogen-to-boron ratio of from 3:1, in the case of diborane, to 1:1 or even less in the case of the high boron hydride polymers, the so-called yellow solids. Although diborane, the product here, can be used and thus be reformed in the system, it is obviously unnecessary to do this so that the practical boron hydrides may be designated as those with a hydrogen-to-boron ratio of less than 3:1. It has also been found that any substituted boron hydride, the substituting atomic species being restricted to chlorine, carbon and its combinations with hydrogen, makes a good feed for the process.

In general, a reactor should be used that has a granular bed, such as carbon or graphite particles, when utilizing the boranes as a boron source. When a solid borane is used it conveniently may be fed into or fed with the granular bed of the reactor. When liquid or vaporous boranes are used as boron sources, they may be fed into the granular bed by direct introduction, in the case of gases, or by vaporization, in the case of liquids. If liquid or gaseous boranes are used, it is desirable that the residence time of such boranes in that portion of the reactor maintained between about 100° C. and the reaction temperature (e.g. an introduction pipe) be as short as practicable, for in such a temperature range the boranes are decomposed to form elemental boron or boron compounds which, at these temperatures, will only slowly react to yield the desired product.

Another modification made necessary by the use of the boranes is that the quantity of separately introduced hydrogen is lessened since the hydrogen combined in the borane feed will be available to the system and hence acts as a replacement for some of the feed hydrogen ordinarily introduced (e.g. as H).

It has been mentioned that a granular reactor bed is preferred when the boranes are used as boron feed materials. A function of the granular bed is to increase heat transfer to the passing gases by increasing surface area and convection. It is obvious that carbon or graphite particles customarily used for such a granular bed may be replaced wholly or in part by granular boron or boron carbide and thus one may utilize members of several of the clases of boron feed materials simultaneously. Obviously, in such case, the modified hydrogen value requirements of the system must be kept in mind.

Since the diborane product may be used further as a raw material to produce higher boron hydrides, and since most techniques employed to produce such higher boron hydrides also produce by-product boron hydrides that are undesirable, these undesirable higher boron hydrides may thus be used in the system as feeds to be reformed into diborane. Thus, the invention offers an economical means of utilizing boron values to produce particular higher boron hydrides. Other techniques for the reuse of the boron values of these higher boron hydrides are generally much less economical.

The raw material efficiencies of this process are very high since the boron and hydrogen values which do not find their way into the diborane are recycled and the chlorine values are recycled. This recycle is especially economical since few separations are performed or required. Hence, although the exiting gases from the reactor consist only in small part of boron-hydrogen bonded chlorinated boranes (generally between about 1 mole percent and 15 mole percent, a customary operating level being about 10 percent) the process is nevertheless a very efficient one.

It is seen that our reactor, with its boron feeds and use of hydrogen chloride, is a unique economical means of producing diborane. But its most significant uniqueness and most favorable economical operation is achieved using it in an overall recycle system wherein only diborane (and, of course, possible carbon or other contaminants) is removed from the system and all other exit material is recycled back to the reactor. Such operation not only reduces expensive separation processes, but also eliminates the need for most by-product recovery systems found in other diborane producing processes.

It is obvious that in operation many cost saving devices may be used if desired, such as utilizing hydrocarbons such as natural gas or methane as a hydrogen source (the carbon can be handled as is the carbon from boron carbide or impurities), using chlorine or hydrogen chloride to make up any chlorine value losses in processing, and using chlorinated hydrocarbons to furnish both hydrogen and chlorine values.

As a further modification, it is possible to remove boron trichloride from the purified boron trichloride recycle stream and add boron values to the reactor together with chlorine values in the form of chlorine or hydrogen chloride (with appropriate downward adjustment of the hydrogen input, if this latter material is used). These additional boron and chlorine-containing materials are added at the same rate at which the $BCl_3$ is removed from the normal recycle stream and under these circumstances there is little change in the operating characteristics of the process or in the products obtained. Hence, an excellent and economical source of boron trichloride is provided.

The rate of the reaction may be determined by examination of the following table which shows the retention time in seconds necessary at various temperatures to achieve various percentages of probable thermodynamic equilibrium using a bed of boron carbide.

TABLE I

| Temperature, ° C. | 50% | 80% | 90% |
|---|---|---|---|
| 900 | 14 | 73 | 125 |
| 1,000 | 4.1 | 18 | 30 |
| 1,200 | 0.39 | 1.4 | 2.3 |

Examples are set forth below for illustrative purposes but are not to be construed as imposing limitations on the scope of the invention other than as set forth in the appended claims.

*Example 1.*—Through a bed of boron carbide held at 1050° C. was passed a feed stream consisting primarily of hydrogen, hydrogen chloride, and boron trichloride and lesser amounts of chlorinated boranes, diborane and possible inerts such as argon and nitrogen. This gaseous or vaporous feed was proportioned in the fashion as will herein be described.

The reactor used was a 1" diameter, 5-foot long electrically heated quartz tube and allowed the measurement of species, partial recycle, and a fast quenching technique. Several preliminary runs were made to determine approximate conversions and recycle rates to be expected in continuous operation.

The chlorinated boranes and the boron trichloride exiting the reactor were substantially separated by condensation from the remainder of the exiting species in a column operated at about —70° C. This remainder was recycled back to the reactor and also periodically sampled and analyzed. The rate and amount of removal of chlorinated boranes and boron trichloride was measured. Additional hydrogen was fed to the reactor at approximately the rate at which hydrogen values were removed from the system as chlorinated boranes. Boron trichloride was fed to the reactor at approximately the rate and in the amount at which it had been removed from the system as boron trichloride—including the amount which would have been produced by suitable disproportionation of the chlorinated boranes. After a period of operating this system in a continuous fashion, while altering feed quantities as was found necessary to conform to the above proportioning, it was determined that the rate and amount of chlorinated boranes exiting the reactor was approximately constant and the rate at which the other species exited the reactor became relatively stable also. The boron values of the exiting stream were more than the boron values of the entering streams indicating that boron values from the solid bed were being volatilized. An approximate analysis of the total entering and exiting gases after equilibrium of the system was achieved. Results were as follows, using $BHCl_2$ as the chlorinated borane species:

| Gas | Mole Percent Entering | Mole Percent Exiting |
|---|---|---|
| $BCl_3$ | 33 | 31 |
| $H_2$ | 50 | 47 |
| $HCl$ | 17 | 17 |
| $BHCl_2$ | 0 | 5 |

The total feed gas rate was approximately three grams per minute.

When a disproportionation unit is provided to convert the chlorinated boranes to diborane and boron trichloride, and the latter recycled together with any additional boron trichloride exiting the reactor, an overall material balance for the system may be prepared showing only the input species, boron carbide and hydrogen, and only diborane and carbon as exit species.

*Example 2.*—To the experimental set-up as described in Example 1 was added a suitable disproportionation system operating at atmospheric pressure and within a temperature range of about 65° C.–80° C. It consisted of a Pyrex heat exchanger into which the boron trichloride-dichloroborane mixture was flashed and then the disproportionated mixture was fed to the bottom tray of a 10-plate Pyrex distillation column operating under a diborane reflux. The overhead, consisting principally of diborane, was removed as product and the bottoms, primarily boron trichloride, was recycled back to the reactor.

This system was operated under the same conditions as Example 1 except that elemental boron was used in place of boron carbide. After process equilibrium had been achieved, the boron trichloride recycle stream consisted of the boron trichloride recycle stream from the disproportionation recovery system. The system thus operated under full recycle of all exiting species except for product diborane. The achievement of full process equilibrium in this system took nearly four hours and during this period external boron trichloride was fed in a gradually lessened amount as the recycle from the disproportionation recovery section came on stream. After process equilibrium had been achieved, no external boron trichloride was fed. After equilibrium was achieved, a small amount of chlorine was fed into the reactor to make up for the chlorine values removed with the diborane stream. Calculations show that a second diborane distillation column would have removed these chlorine values from the product and thus obviated the need for chlorine value make-up.

The diborane product removed at the rate of about twenty milligrams per minute was 87% pure. The gas compositions were essentially those of Example 1 except that the mole percent of $BHCl_2$ entering (admixed with the $BCl_3$ recycle stream) was about one percent because of incomplete disproportionation and the mole percent of exiting $BHCl_2$ was close to six percent. This increase in $BHCl_2$ exit percentage using boron in place of boron crabide has been consistently noted. The use of unsubstituted boranes as a boron feed yields similar higher $BHCl_2$ exit percentages.

*Example 3.*—The experimental set-up of Example 2 was used with a modification of the reactor such that granular coke could be continuously fed through the reactor by the addition of a closed feed hopper, a motor driven screw feeder and a discharge hopper; the reactor unit being horizontal. The granular coke, −⅜″+⅛″, had been prepared previously by passing chlorine gas through it at 1000° C. to chemically deactivate it to chlorine species. High boron hydride polymers, the so-called "yellow solids," with a B:H ratio of about 1:1, were used as feed and were admixed with the coke in the weight ratio of one part of yellow solids per ten parts of coke.

This run was made at 950° C. with other conditions as in Example 2. The rate of feed of coke-yellow solid mix was held at approximately 170 mg. per minute and after process equilibrium was achieved the product removal was fluctuating around 21 mg. per minute of 85% $B_2H_6$. The mole percent of $BHCl_2$ exiting the reactor was five and the analysis of the spent coke showed better than 90% removal of boron values with one sample showing essentially complete removal and one being as low as 60%.

*Example 4.*—This run was made using the experimental set-up of Example 2 except that a ⅞″ x 1¼″ electrically heated graphite tube was used as the reactor and it was packed with −⅜″ +⅛″ chlorine deactivated coke. The boron feed was volatilized pentaborane at a rate of about 40 mg. per minute which was entered into the recycle gas stream at a point close to the reactor entrance where the temperature was approximately 70° C. The reactor was maintained at 1200° C. A liquid boron trichloride quench stream impinging on the exit of the reactor was utilized and quench $BCl_3$ was fed at about twice the rate of the recycle $BCl_3$ feed.

The mole percent of $BHCl_2$ exiting the reactor was about 9 which would correspond to about 15 when the quench $BCl_3$ is subtracted. This greater yield of $BHCl_2$ was caused by both the higher temperature of operation and the much faster quench of exit gases.

The production rate of diborane was about 65 mg. per minute of 80% $B_2H_6$.

*Example 5.*—The experimental set-up of Example 2 was used and boron carbide was used as bed material. In addition, tetraborane was passed in as an additional feed with the recycle stream after the fashion of pentaborane in Example 4. The tetraborane feed rate was 30 mg. per minute. The temperature of the reactor was held at 1000° C. Additional chlorine was fed to the reactor at the rate of about 270 mg. per minute to make up for chlorine values removed as boron trichloride. The boron trichloride was removed as a by-product from the bottoms of the diborane-boron trichloride separation column at the rate of 300 mg. per minute and diborane removed as product at the rate of about 22 mg. per minute of 81% $B_2H_6$.

Following the run the bed residue was analyzed for elemental boron residue from tetraborane decomposition and the minor amount present corresponded to less than one percent of the boron fed as tetraborane.

*Example 6.*—To demonstrate the equivalence of various sources of H and Cl and the dependence of the equilibrium status in a reactor (under given conditions) on the hydrogen and chlorine quantities solely, the set-up described in Example 1 was used with boron carbide as the bed. The method of operation during each of three determinations described below was the same. A single pass was made through the reactor with a fixed feed composition and the exit gas was analyzed. A second pass was made using a feed composition which consisted of hydrogen to the extent it was present in the first pass exit plus the hydrogen associated with the dichloroborane in the first pass exit, hydrogen chloride to the extent it was present in the first pass exit and boron trichloride to the extent it was present in the first pass exit plus that which would theoretically be obtained upon disproportionation of the dichloroborane in the first pass exit. In addition, a third pass was made, where necessary, proportioning feeds in the same fashion as for the second pass. In all three determinations the total initial pass feed rate was approximately three grams per minute.

The first pass feed for the first determination consisted of 100 mole percent hydrogen chloride. At the conclusion of the third pass, the composition of the exit gas was within the range of analytical error of that which is reported in Example 1, and calculated composition of a fourth pass feed was the same as that reported in Example 1.

The first pass feed for the second determination consisted of 40 mole percent boron trichloride and 60 mole percent hydrogen. At the conclusion of the second pass, the composition of the exit gas was within the range of analytical error of that which is reported in Example 1. Of course, it also agreed with the calculated third pass requirements.

The first pass feed for the third determination consisted of 30 mole percent boron trichloride, 45 mole percent hydrogen, and 25 mole percent hydrogen chloride. At the conclusion of the second pass the composition agreed with the first two determinations and there was little deviation event after the first pass.

Obviously many modifications and variations of the invention as hereinbefore set forth may be made without departing from the spirit and scope thereof, and therefore only such limitations should be imposed as are indicated in the appended claims.

We claim:
1. A process for the production of diborane comprising: passing a gaseous stream containing feed hydrogen, recycle hydrogen, hydrogen chloride and boron trichloride into a reaction zone maintained at a temperature between about 700° C. and 1500° C.; passing a source of boron values selected from the class consisting of elemental boron, boron carbide, unsubstituted boron hydrides with a hydrogen-to-boron ratio of less than 3:1 and mixtures thereof into said zone; withdrawing a mixture of gases and vapors therefrom; disproportionating the contained boron-hydrogen bonded chlorinated boranes in said mixture to produce diborane; separating and recovering said diborane as product; recycling the remaining hydrogen, hydrogen chloride and boron trichloride; and adding fresh feed hydrogen to said recycle.

2. The process of claim 1 wherein boron carbide serves as said source of boron values.

3. The process of claim 1 wherein the boron source is solid boron.

4. The process of claim 1 wherein the boron source is a boron hydride.

5. The process of claim 1 wherein the boron source is a mixture of boron carbide and unsubstituted boron hydrides with a hydrogen-to-boron ratio of less than 3:1 and is fed at such a rate that the boron values fed about equal the rate of the boron values withdrawn as diborane.

6. The process of claim 1 wherein hydrogen gas serves as a hydrogen source.

7. The process of claim 1 wherein the fresh feed hydrogen is fed at such a rate that the hydrogen fed about equals the rate of the hydrogen values withdrawn less any hydrogen values fed as boron hydrides.

8. The process of claim 1 wherein the reaction zone is maintained at a temperature between about 900° C. and 1300° C.

9. A process for the production of diborane comprising: passing a gaseous stream containing feed hydrogen, recycle hydrogen, hydrogen chloride and boron trichloride into a reaction zone maintained at a temperature between about 700° C. and 1500° C.; passing a source of boron values selected from the class consisting of elemental boron, boron carbide, unsubstituted boron hydrides with a hydrogen-to-boron ratio of less than 3:1 and mixtures thereof into said zone; withdrawing a mixture of gases and vapors therefrom; fractionating said mixture of gases and vapors whereby to form two separate streams, the first of said streams comprising a mixture of hydrogen and hydrogen chloride and the second of said streams comprising a mixture of boron trichloride and boron-hydrogen bonded chlorinated boranes; recycling said first stream; disproportionating said second stream whereby to produce diborane and boron trichloride, separating and recovering said diborane as product; and recycling the said boron trichloride; and adding fresh feed hydrogen to said recycle.

References Cited by the Examiner

UNITED STATES PATENTS

| 2,469,879 | 5/1949 | Hurd | 23—204 |
| 2,744,810 | 5/1956 | Jackson | 23—14 |

FOREIGN PATENTS

| 623,761 | 5/1949 | Great Britain. |

OTHER REFERENCES

Schlesinger et al.: J.A.C.S., vol. 53, pp. 4321–4332, December 1931.

Schechter et al.: "Boron Hydrides and Related Compounds," Dept. of Navy, Bureau of Aeronautics Contract No. a(s) 10992, March 1951, pages 19 and 20 (declassified Jan. 5, 1954).

Stock et al.: "Chem Abstracts," vol. 30, columns 7056, 7057 (1936).

OSCAR R. VERTIZ, *Primary Examiner.*

ROGER L. CAMPBELL, LEON D. ROSDOL,
*Examiners.*

W. A. KEMMEL, C. D. QUARFORTH,
M. WEISSMAN, *Assistant Examiners.*